United States Patent
Schauer et al.

(10) Patent No.: US 11,387,460 B2
(45) Date of Patent: Jul. 12, 2022

(54) SYSTEMS AND METHODS FOR MAKING STRUCTURES DEFINED BY CNT PULP NETWORKS

(71) Applicant: Nanocomp Technologies, Inc., The Woodlands, TX (US)

(72) Inventors: Mark W. Schauer, Peterborough, NH (US); Eitan Zeira, Hollis, NH (US); David Gailus, Merrimack, NH (US); Brian White, Manchester, NH (US)

(73) Assignee: Nanocomp Technologies, Inc., The Woodlands, TX (US)

( * ) Notice: Subject to any disclaimer, the term of this patent is extended or adjusted under 35 U.S.C. 154(b) by 0 days.

(21) Appl. No.: 16/747,618

(22) Filed: Jan. 21, 2020

(65) Prior Publication Data
US 2020/0161661 A1    May 21, 2020

Related U.S. Application Data

(62) Division of application No. 15/351,912, filed on Nov. 15, 2016, now Pat. No. 10,581,082.

(51) Int. Cl.
*H01M 4/66*    (2006.01)
*H01G 11/86*    (2013.01)
(Continued)

(52) U.S. Cl.
CPC ............ *H01M 4/663* (2013.01); *H01G 11/24* (2013.01); *H01G 11/34* (2013.01); *H01G 11/36* (2013.01);
(Continued)

(58) Field of Classification Search
CPC .... H01M 4/0404; H01M 4/0428; H01M 4/13; H01M 4/131; H01M 4/134; H01M 4/136;
(Continued)

(56) References Cited

U.S. PATENT DOCUMENTS 5,798,137 A * 8/1998 Lord ................ B01J 8/245
427/213
2007/0202403 A1    8/2007 Oh et al.
(Continued)

FOREIGN PATENT DOCUMENTS

| | | |
|---|---|---|
| JP | 2012221672 A | 11/2012 |
| JP | 2016025077 A | 2/2016 |
| WO | 2007029934 A | 3/2007 |

OTHER PUBLICATIONS

Peng C et al.: "Carbon nanotube and conducting polymer composites for supercapacitors", Progress in Natural Science, Science Press, Beijing, CN, vol. 18, No. 7, Jul. 10, 2008 (Jul. 10, 2008), pp. 777-788, XP022697886, ISSN: 1002-0071, DOI: 10.1016/J.PNSC. 2008.03.002 [retrieved on May 29, 2008].

*Primary Examiner* — Brittany L Raymond
(74) *Attorney, Agent, or Firm* — Nanocomp Technologies, Inc.; Robert Diaz

(57) ABSTRACT

Provided herein are products and methods for making structures having a body defined by a carbon nanotube (CNT) pulp network having a long-range connectivity exceeding a percolation threshold of the structure to permit electron transport throughout the structure, an active material dispersed within the body, and a binder material binding the active material to the CNT pulp network within the body.

5 Claims, 11 Drawing Sheets

Placing a quantity of dispersible CNT pulp in a CVD reactor.
1201

Flow silane gas over the dispersible CNT pulp within the CVD reactor.
1203

Heat the CVD reactor to coat the dispersible CNT pulp with a nanoscale layer of silicon.
1205

(51) Int. Cl.

| | | |
|---|---|---|
| *H01M 4/04* | (2006.01) | |
| *H01M 4/134* | (2010.01) | |
| *H01G 11/50* | (2013.01) | |
| *H01M 4/139* | (2010.01) | |
| *H01M 10/052* | (2010.01) | |
| *H01M 4/1395* | (2010.01) | |
| *H01M 4/38* | (2006.01) | |
| *H01M 4/13* | (2010.01) | |
| *H01G 11/70* | (2013.01) | |
| *H01G 11/24* | (2013.01) | |
| *H01G 11/34* | (2013.01) | |
| *H01G 11/36* | (2013.01) | |
| *H01G 11/38* | (2013.01) | |
| *H01G 11/52* | (2013.01) | |
| *H01G 11/68* | (2013.01) | |
| *H01M 4/1393* | (2010.01) | |
| *H01M 4/62* | (2006.01) | |
| *H01M 10/0525* | (2010.01) | |
| *H01M 4/1391* | (2010.01) | |
| *H01M 4/36* | (2006.01) | |
| *H01M 4/131* | (2010.01) | |
| *H01G 11/46* | (2013.01) | |
| *H01M 4/505* | (2010.01) | |
| *H01M 4/58* | (2010.01) | |
| *H01M 4/1397* | (2010.01) | |
| *H01M 4/525* | (2010.01) | |
| *H01M 4/136* | (2010.01) | |
| *H01G 11/28* | (2013.01) | |

(52) U.S. Cl.
CPC ............ *H01G 11/38* (2013.01); *H01G 11/50* (2013.01); *H01G 11/52* (2013.01); *H01G 11/68* (2013.01); *H01G 11/70* (2013.01); *H01G 11/86* (2013.01); *H01M 4/0404* (2013.01); *H01M 4/0428* (2013.01); *H01M 4/13* (2013.01); *H01M 4/134* (2013.01); *H01M 4/139* (2013.01); *H01M 4/1393* (2013.01); *H01M 4/1395* (2013.01); *H01M 4/386* (2013.01); *H01M 4/622* (2013.01); *H01M 4/623* (2013.01); *H01M 4/625* (2013.01); *H01M 4/661* (2013.01); *H01M 10/052* (2013.01); *H01M 10/0525* (2013.01); *H01G 11/28* (2013.01); *H01G 11/46* (2013.01); *H01M 4/131* (2013.01); *H01M 4/136* (2013.01); *H01M 4/1391* (2013.01); *H01M 4/1397* (2013.01); *H01M 4/366* (2013.01); *H01M 4/505* (2013.01); *H01M 4/525* (2013.01); *H01M 4/5825* (2013.01)

(58) Field of Classification Search
CPC .. H01M 4/139; H01M 4/1391; H01M 4/1393; H01M 4/1395; H01M 4/1397; H01M 4/362; H01M 4/366; H01M 4/386; H01M 4/505; H01M 4/525; H01M 4/5825; H01M 4/622; H01M 4/623; H01M 4/625; H01M 4/661; H01M 4/663; H01M 10/052; H01M 10/0525; H01G 11/24; H01G 11/28; H01G 11/34; H01G 11/36; H01G 11/38; H01G 11/46; H01G 11/50; H01G 11/52; H01G 11/68; H01G 11/70; H01G 11/86
See application file for complete search history.

(56) References Cited

U.S. PATENT DOCUMENTS

| | | | | |
|---|---|---|---|---|
| 2010/0310941 | A1* | 12/2010 | Kumta | .................. H01M 4/134 429/231.95 |
| 2011/0256451 | A1* | 10/2011 | Cui | ....................... H01M 4/667 429/218.1 |
| 2014/0332731 | A1 | 11/2014 | Ma et al. | |

* cited by examiner

```
                    200
                      ↘
         ┌─────────────────────────────────────────────────────────────────┐
         │  Mix a carbon nanotube (CNT) pulp with a binder, and active material, and a │
         │                    solvent to form a dispersion.                │
         │                                201                              │
         └─────────────────────────────────────────────────────────────────┘
                                         ↓
         ┌─────────────────────────────────────────────────────────────────┐
         │                  Apply the dispersion to a substrate.           │
         │                                203                              │
         └─────────────────────────────────────────────────────────────────┘
                                         ↓
         ┌─────────────────────────────────────────────────────────────────┐
         │  Cure the dispersion to form a structure having a CNT pulp network formed │
         │ therein, the CNT pulp being provided in an amount sufficient to permit electron │
         │           transport throughout the structure via the network.   │
         │                                205                              │
         └─────────────────────────────────────────────────────────────────┘
```

Pulp, by a pulping machine, one or more of a CNT sheet, a CNT strip, a CNT tape, bulk-collected CNT's, a CNT yarn, any well-entangled CNT material, or combinations thereof to form a CNT pulp.
1101

Grind, in a first grinder, at least a portion of the CNT pulp.
1103

Disaggregate, in a second grinder, the CNT pulp.
1105

FIG. 3

SYSTEMS AND METHODS FOR MAKING STRUCTURES DEFINED BY CNT PULP NETWORKS

CROSS-REFERENCE TO RELATED APPLICATIONS

The present application is a divisional application of U.S. patent application Ser. No. 15/351,912, filed Nov. 15, 2016. The noted application is incorporated herein by reference.

FIELD

The present disclosure relates to compositions and methods for making carbon nanotube (CNT) pulp networks and particularly to CNT pulp networks defining structures.

BACKGROUND

Rechargeable Energy Storage Devices (ESD's), such as Lithium Ion Batteries (LiB's) and Super-Capacitors (SC's) are widely used in electronic devices. However, ESD's are generally rigid structures having energy storing active materials of limited thickness and capacity. Moreover, the active materials in LiB cathodes are generally metal oxides that have little or no inherent electrical conductivity. In order to transport electrons throughout the cathode active material, a conductive additive must be employed. Incumbent technology employs some form of carbon black (CB) as the conductive additive, which can limit the usable thickness of the cathode active material layer. Thicker active material layers, in general, require more CB to achieve the needed electrical conductivity. However, if the concentration of CB exceeds about 5% by weight, the material becomes mechanically unstable, and will mud-crack upon drying. This limits the thickness of the cathode layer to less than about 100 microns, requiring many layers to achieve the needed capacity for a full battery. Each layer must have a separator and current collector, which can take up space and add weight without contributing to energy storage capacity. Having thicker active layers would reduce the number of layers in the battery, and therefore the number of separators, thus leading to an increase in volumetric and gravimetric capacity of the overall battery cell.

Well separated, short (<100 microns in length) carbon nanotubes in powder form have been used as conductive additives in LiB cathodes, and have achieved percolation threshold for electron transport in the active material at about 3 times lower concentration than carbon black. However, these powdered CNTs did not impart improvements in mechanical strength.

SUMMARY

In some embodiments, a structure is provided. The structure includes a body defined by a network of interconnected carbon nanotube (CNT) pulp, the CNT pulp being provided in an amount sufficient to permit electron transport throughout the structure. The structure also includes a binder material dispersed within the CNT pulp network. The structure also includes an active material distributed throughout the body for ion storage.

In some embodiments, a method for forming a structure is provided. The method includes mixing a carbon nanotube (CNT) pulp with a binder, an active material, and a solvent to form a dispersion. The method also includes applying the dispersion to a substrate. The method also includes curing the dispersion to form a structure having a CNT pulp network formed therein, the CNT pulp being provided in an amount sufficient to permit electron transport throughout the structure via the network.

In some embodiments, an energy storage device is provided. The energy storage device includes a housing. The energy storage device also includes a first current collector positioned in the housing. The energy storage device also includes a first structure in electrical communication with the first current collector. The first structure includes a first body defined by a first network of interconnected carbon nanotube (CNT) pulp, the CNT pulp being provided in an amount sufficient to permit electron transport throughout the first structure. The first structure also includes a first binder material dispersed within the first CNT pulp network. The first structure also includes a first active material distributed throughout the first body for ion storage.

The energy storage device also includes a second current collector positioned in the housing. The energy storage device also includes a second structure in electrical communication with the second current collector.

The second structure includes a second body defined by a second network of interconnected carbon nanotube (CNT) pulp, the CNT pulp being provided in an amount sufficient to permit electron transport throughout the second structure. The second structure also includes a second binder material dispersed within the second CNT pulp network. The second structure also includes a second active material distributed throughout the second body for ion storage. The energy storage device also includes a separator interposed between the first structure and the second structure for inhibiting direct electrical contact between the first and second structures and for permitting ion passage between the first and second structures.

In some embodiments, a method for forming a nanoscale silicon layer on the CNT pulp is provided. The method includes placing a quantity of CNT pulp in a Chemical Vapor Deposition (CVD) reactor. The method also includes flowing silane gas over the CNT pulp within the CVD reactor. The method also includes heating the CNT pulp in order to coat the CNT pulp with a nanoscale layer of silicon.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 1 is a flowchart illustrating a method for forming a structure defined by a CNT pulp network in accordance with various embodiments.

FIG. 3 is a flowchart illustrating a method for forming a CNT pulp in accordance with various embodiments.

Figure 2:
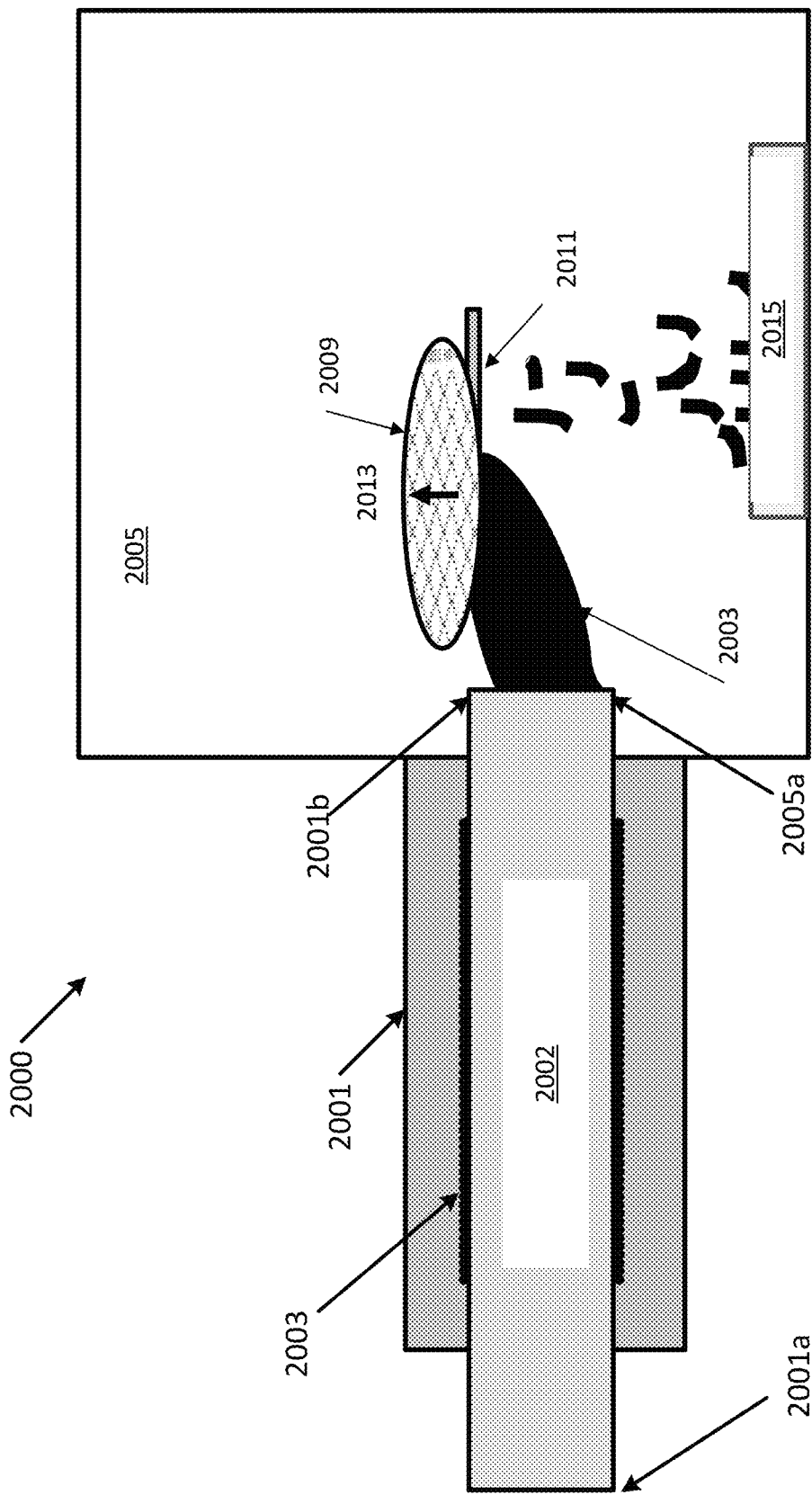
FIG. 2 is a diagram illustrating a system for direct collection of well-entangled networks of CNT material in accordance with various embodiments.

While the above-identified drawings set forth present disclosure, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the present disclosure.

DETAILED DESCRIPTION

In accordance with various embodiments, improved compositions and methods for making structures having carbon nanotube (CNT) pulp networks therein are provided. The compositions and methods, in accordance with various embodiments can include a structure having a body defined by a CNT pulp network, an active material, and a binder binding the active material and the CNT pulp network. The structure can be formed, in some embodiments, by curing a dispersion including a CNT pulp dispersed within an active material, a solvent, and a binder.

In some embodiments, the structures incorporate a interconnected network formed from a plurality of bundles of well-entangled CNTs that achieve a percolation threshold for electron transport throughout the active material at a much lower concentration than either CB or powdered CNTs. In some embodiments, a well-entangled network of branched, bundled, and well-dispersed CNT pulp containing long CNTs (>1 mm) can provide the necessary electrical and ionic conductivity for a LiB at about 8 to 16 times lower concentration than carbon black, and also provide the mechanical support that enables thicker cathodes, flexible batteries, and advanced anode and cathode chemistries.

As used herein, percolation threshold refers to a concentration or weight percentage of conductive additive (such as carbon black or CNT pulp) sufficient to provide electrical and thermal conductivity throughout the structure. That is, above the percolation threshold, the conductive additives are sufficiently connected to provide electrical and/or thermal conductivity throughout the structure. In the case of electrical conductivity, the interconnected conductive additives permit electron transport throughout the active material. In contrast, below the percolation threshold, the long-range connectivity between the interconnected conductive additives is insufficient to provide conductivity throughout the structure and thus electron transport, if any, is limited to a small, localized portion of the active material.

The well-entangled network described in the present disclosure also imparts improved mechanical strength for enabling thicker cathodes, nano-scale silicon additions in anodes, and flexibility of the structure. In some embodiments, the structures can include one or more of a cathode, an anode, or an electrode of an Energy Storage Device ESD, such as a battery or capacitor.

Referring now to FIG. 1, a method 200 is provided for forming a structure in accordance with various embodiments. The method 200 includes a step of mixing 201 a carbon nanotube (CNT) pulp with a binder, and active material, and a solvent to form a dispersion. The method 200 further includes a step of applying 203 the dispersion to a substrate. The method 200 further includes a step of curing 205 the dispersion to form a structure having a CNT pulp network formed therein, the CNT pulp network having a long-range connectivity exceeding a percolation threshold of the structure.

The step of mixing 201 can include, for example, mixing a CNT pulp, a binder, an active material, and a solvent together using a high-shear mixer such as, for example, a Flacktek® dual asymmetric centrifugal laboratory mixer. In some embodiments, the step of mixing 201 can involve a single step. In some embodiments, the step of mixing 201 can include two steps. For example, in accordance with various embodiments, the step of mixing 201 can be performed by initially mixing the CNT pulp with the binder and the solvent to form the dispersion and then adding the active material and/or additional solvent to the dispersion and mixing again. In some embodiments, initially mixing the CNT pulp with the binder and the solvent can be performed by operating the high-shear mixer at any appropriate speed for a period of time required to achieve a substantially uniform distribution of the CNT pulp and the binder throughout the dispersion. The dispersion of CNT pulp, binder, and solvent can be prepared having any suitable viscosity, including, for example, any viscosity of 3,000 centipoise or higher. In some embodiments this dispersion can exhibit a very high viscosity, for example, about 20,000 to about 250,000 centipoise in order to achieve a good dispersion. Such high viscosity can prevent clumping of the CNT pulp within the dispersion during extended storage prior to curing. Therefore, in some embodiments, dispersions formed from the CNT pulp, the binder, and the solvent and having such high viscosity can be combined at a later time (e.g., after warehouse storage and/or shipment) with the active material and solvent, and mixed to complete the dispersion.

In some embodiments, when the active material is added and mixed, the dispersion can be diluted to produce a dispersion of viscosity suitable for applying (203) and curing (205). In some embodiments, in order to promote formation of the CNT pulp network and provide a downstream consistency suitable for applying and curing to form the structure (e.g., as in the steps of applying 203 and curing 205), the dispersion can be diluted to a dispersion having a viscosity of, for example, about 3,000 to about 6,000 centipoise for applying and curing. In some embodiments, to preserve the substantially uniform distribution of CNT pulp and to preserve and promote formation of the well-entangled networks, the highly viscous dispersion can be serially diluted to the desired viscosity. That is, in some embodiments, a portion of a total amount of solvent required to achieve the desired viscosity (e.g., between 3,000 to 6,000 centipoise) can be added and mixed with the active material, then an additional portion of the solvent can be added and mixed. This process can be repeated until the desired viscosity, and thus the desired dispersion, is achieved.

In some embodiments, the CNT pulp can include, CNTs. Presently, there exist multiple processes and variations thereof for growing nanotubes, and forming yarns, sheets or cable structures made from these nanotubes to act as a source material for the pulp. These include: (1) Chemical Vapor Deposition (CVD), a common process that can occur at near ambient or at high pressures, and at temperatures above about 400° C., (2) Arc Discharge, a high temperature process that can give rise to tubes having a high degree of perfection, and (3) Laser ablation.

In some embodiments, a CVD process or similar gas phase pyrolysis procedure known in the industry can be used to generate the appropriate nanostructures, including carbon nanotubes. Growth temperatures for a CVD process can be comparatively low ranging, for instance, from about 400° C. to about 1350° C. Carbon nanotubes (CNTs), both single wall (SWNT) or multiwall (MWNT), may be grown, in some embodiments, by exposing nanoscaled catalyst particles in the presence of reagent carbon-containing gases (i.e., gaseous carbon source). In particular, the nanoscaled catalyst particles may be introduced into the reagent carbon-containing gases, either by addition of existing particles or by in situ synthesis of the particles from a metal-organic precursor, or even non-metallic catalysts. Although both SWNT and MWNT may be grown, in certain instances, SWNT may be selected due to their relatively higher growth rate and tendency to form rope-like structures, which may offer advantages in handling, thermal conductivity, electronic properties, and strength.

The strength of the individual carbon nanotubes generated in connection with the present invention can be, for example, about 30 GPa or more. Strength, as should be noted, is sensitive to defects. However, the elastic modulus of the carbon nanotubes fabricated in the present invention may not be sensitive to defects and can vary from about 1 to about 1.2 TPa. Moreover, the strain to failure of these nanotubes, which generally can be a structure sensitive parameter, may range from a about 10% to a maximum of about 25% in the present invention.

Furthermore, the nanotubes of the present invention can be provided with relatively small diameter. In an embodiment of the present invention, the nanotubes fabricated in the present invention can be provided with a diameter in a range of from less than 1 nm to about 30 nm. It should be appreciated that the carbon nanotubes made in accordance with one embodiment of the present invention may be extended in length (i.e., long tubes) when compared to commercially available carbon nanotubes. In an embodiment of the present invention, the nanotubes fabricated in the present invention can be provided with a length in the millimeter (mm) range.

It should be noted that although reference is made throughout the application to nanotubes synthesized from carbon, other compound(s), such as boron nitride, MoS2, or a combination thereof may be used in the synthesis of nanotubes in connection with the present invention. For instance, it should be understood that boron nitride nanotubes may also be grown, but with different chemical precursors. In addition, it should be noted that boron and/or nitrogen may also be used to reduce resistivity in individual carbon nanotubes. Furthermore, other methods, such as plasma CVD or the like can also be used to fabricate the nanotubes of the present invention.

In some embodiments, the CNT pulp can include, for example, CNT pulp formed as described with greater detail below with reference to FIG. 3. In some embodiments, the CNT pulp can be any CNT pulp capable of forming a three-dimensional CNT pulp network for providing a conductive aid having long-range electrical connectivity throughout the structure (i.e., exceeding a percolation threshold of the structure) while enhancing mechanical properties and stability of the structure. In general, the CNT pulp can be made from any CNT sheet, CNT strip, CNT tape, bulk-collected CNTs, CNT yarns, any other suitable well-entangled CNT material, or combinations thereof.

In some embodiments, the CNT material, in accordance with various embodiments, can be produced by Floating Catalyst Chemical Vapor Deposition (FC-CVD) as described in U.S. Pat. No. 8,999,285, the contents of which are incorporated herein in their entirety. The FC-CVD method of CNT production can lead to very long nanotubes (>100 microns) that become well-entangled while in the gas phase as they are being created. As the CNT material exits the hot zone of the furnace, the nanotubes entangle, bundle and otherwise coalesce into and extended network of interconnected and branching bundles that is not obtainable by other CNT production processes. In some embodiments, the extended network of interconnected CNTs produced by FC-CVD is preserved through the pulping process, thus improving electrical and mechanical properties as compared to conventional carbon black and CNT powder.

In some embodiments, referring now to FIG. 2, CNT material can be collected from the FV-CVD reactor by a collection system 2000. The system 2000, in some embodiments, can be coupled to a synthesis chamber 2001. The synthesis chamber 2001, in general, includes an entrance end 2001a, into which reaction gases may be supplied, a hot zone 2002, where synthesis of extended length nanotubes may occur, and an exit end 2001b from which the products of the reaction, namely the extended length nanotubes and exhaust gases, may exit and be collected. In some embodiments, synthesis chamber 2001 may include a quartz tube 2003, extending through the hot zone 2002. Although illustrated generally in FIG. 2, it should be appreciated that other configurations may be employed in the design of synthesis chamber 2001.

The system 2000, in some embodiments, includes a housing 2005. The housing 2005, as illustrated in FIG. 2, may be substantially airtight to minimize the release of potentially hazardous airborne particulates from within the synthesis chamber 2001 into the environment, and to prevent oxygen from entering into the system 2000 and reaching the synthesis chamber 2001. In particular, the presence of oxygen within the synthesis chamber 2001 can affect the integrity and compromise the production of the nanotubes.

System 2000 may also include an inlet 2005a of the housing 2005 for engaging the exit end 2001b of the synthesis chamber 2001 in a substantially airtight manner. In some embodiments, as the CNT material exits the synthesis chamber 2001, the nanotubes entangle, bundle and otherwise coalesce into and extended network of interconnected and branching bundles. In some embodiments, these extended networks tend to form a hollow CNT "sock" similar in shape to a windsock inflated by a breeze. Thus, the CNTs can be collected within the housing 2005 from the synthesis chamber 2001 by drawing the CNT sock 2007 onto a rotating mesh disk 2009 (e.g., by vacuum suction on a back side of the disk 2007) and removing the CNTs from the rotating disk 2009 by a scalpel or "doctor" blade 2011, as shown in FIG. 2. In particular, as the CNT sock 2007 is drawn onto the rotating mesh disk 2009, the CNT material forms a film on the disk 2009, which the blade 2011 then scrapes off and severs as a new portion of the CNT sock 2007 is drawn onto the disk 2009. The CNT material can then fall into or otherwise be transported to a collection bin 2015 or other collection receptacle for subsequent pulping.

In some embodiments, the vacuum suction can be provided as a portion of at least one gas exhaust 2013 through which gases and heat may leave the housing 2005. Gas exiting from exhaust 2013, in an embodiment, may be allowed to pass through a liquid, such as water, or a filter to collect nanomaterials not gathered upstream of the exhaust 2007. In addition, the exhaust gas may be treated with a flame in order to de-energize various components of the exhaust gas, for instance, reactive hydrogen may be oxidized to form water.

Although described above with reference to a collection system 2000 having a rotating disk 2009 collection mechanism, it will be apparent in view of this disclosure that, in some embodiments, any technique for collecting and removing the CNT material from the FC-CVD environment without destroying the well-entangled CNT network can be used in accordance with various embodiments. For example, collection of the CNT material produced by FC-CVD, in some embodiments, can be performed by formation of CNT yarns or tows (e.g., by twisting collected CNTs together) and/or CNT sheets as described in U.S. Pat. Nos. 7,993,620 and 8,722,171, the contents of each of which are incorporated herein in their entirety.

In some embodiments, the CNT material can initially include iron or other inclusions. In some embodiments, such inclusions are unwanted and can be removed, preferably prior to pulping. For example, iron inclusions, in some embodiments, can be expunged from the CNT material by heating the CNT material to high temperature (e.g., about 1800° C.) in an inert or reducing atmosphere. At such temperatures the iron can be distilled out of the CNT material and re-solidified on a cooler surface. In some embodiments, such removal of inclusions can be performed, for example, in a CVD reactor such as an FV-CVD reactor described above, or any CVD reactor described, for example, in U.S. Pat. Nos. 8,999,285 and 7,993,620.

In some embodiments, inclusions such as, for example iron inclusions, can be removed by heating the CNT material to about 500° C. in air and treated. In some embodiments, for example, the CNT material can be heated at the 500° C. in air for about two hours and then treated with muriatic acid to remove iron inclusions.

In some embodiments, the CNT pulp can be formed from any suitable CNT material, such as, for example, any CNT sheet, CNT strip, CNT tape, bulk-collected CNTs, CNT yarns, any CNT material described herein above, or any other suitable well-entangled CNT material, or combinations thereof. Referring now to FIG. 3, a method 1100 is provided for forming a CNT pulp in accordance with various embodiments. The method 1100 includes a step of pulping 1101 by a pulping machine, one or more of a CNT sheet, a CNT strip, a CNT tape, bulk-collected CNT's, a CNT yarn, any well-entangled CNT material, or combinations thereof to form a CNT pulp. The method also includes a step of grinding 1103 in a first grinder, at least a portion of the CNT pulp. The method also includes a step of disaggregating 1105, in a second grinder, the CNT pulp.

The step of pulping 1101, in accordance with various embodiments, can be performed by placing a strip or sheet or directly collected CNT material into a pulping machine and pulping the material to form a CNT pulp. The pulping machine, in accordance with various embodiments, can include, for example, a Hollander beater, a conical refiner, a stamp mill, or any other suitable mechanical pulping device, or combinations thereof.

In accordance with various embodiments, the CNT pulp can be tested to confirm pulp particle size and then a user can determine whether or not to continue pulping. In some embodiments, the CNT pulp can be prepared for grinding (e.g., as in the step of grinding 1103) by dewatering the CNT pulp to form, for example, a CNT press cake.

The CNT pulp, in some embodiments, can then be dried for further processing. Drying can be performed, for example, by air drying, oven drying, vacuum oven drying, or by any other suitable drying process. In some embodiments, the CNT pulp particles can be dried in an oven at a temperature from about 90° C. to about 110° C. for about 4 to about 12 hours.

The step of grinding 1103, in accordance with various embodiments, can be performed by using a grinder to break up the CNT pulp into CNT pulp particles. In some embodiments, a particle size of the CNT pulp is unchanged by the grinder, which breaks up larger chunks of CNT pulp into constituent CNT pulp particles for subsequent drying. In some embodiments the grinder can include, for example, a coffee grinder, an industrial burr mill, combinations thereof, or any other suitable grinding device.

In some embodiments, the CNT pulp can be chemically modified and/or coated to enhance an ionic conductivity of the CNT pulp. Such chemical modifications can include, for example, polysilazanes, polyureasilazane, conductive polymers, polyamine, polythiophene, infiltration with polyamides, chemical modification to introduce carboxylate or amine functionalities, any modification suitable for enhancing ionic conductivity, or combinations thereof. In some embodiments, the chemical modification and/or coating can be performed after the step of grinding 1103 but before the step of disaggregating 1105. However, it will be apparent in view of this disclosure that the chemical modification and/or coating can be performed at any time including, for example, prior to pulping 1101, after pulping 1101 but before grinding 1103, after grinding 1103 but before disaggregation 1105, after disaggregation 1105, or combinations thereof. It will further be apparent in view of this disclosure that, in some embodiments, the chemical modification and/or coating can be performed in stages at different points throughout the pulping process and/or that multiple modifications and/or coatings can be applied.

The step of disaggregating 1105, in a second grinder, the CNT pulp can be performed by adding the dried CNT pulp to the second grinder (e.g., a coffee grinder, an industrial burr mill, combinations thereof, or any other suitable grinding device). The step of disaggregating 1105, in some embodiments, also includes grinding the dried CNT pulp to break up any remaining clumps or agglomerates, thereby increasing a volume of the CNT pulp to form the CNT pulp. In some embodiments, the step of disaggregating 1105 can produce a CNT pulp having about 5 to about 15 times the volume of the ground CNT pulp produced in the step of grinding 1103 (i.e., the ground CNT pulp is about 5 to about 15 times more dense than the disaggregated CNT pulp). The step of disaggregating 1105 the CNT pulp advantageously provides greater surface area and better dispersion of the CNT pulp. By reducing or eliminating agglomerations, the dispersion of the CNT pulp is improved and the risk of clumping during formation of the CNT pulp network is reduced. By contrast, if the CNT pulp is not well dispersed, the nanotubes will clump, and more material will be required to interconnect the active material particles, thereby reducing the amount of active material and thus reducing the performance of the structure.

Referring again to FIG. 1, in some embodiments, the binder can include, for example, one or more of Polyvinylidene Fluoride (PVDF), Carboxymethyl Cellulose (CMC), Styrene Butadiene Rubber (SBR), or combinations thereof. More generally, the binder can be any material suitable for binding the CNT pulp to the active material in the cured structure.

In some embodiments, the solvent can include, for example, one or more of n-Methyl-2-Pyrrolidone (NMP), propylene carbonate, water, ethanol, cyclohexylpyrrolidone (CHP), 1-benzyl-2-pyrrolidinone (NBenP), aniline, acetonitrile, dimethyl formamide, dichloromethane or combinations thereof (e.g., a solvent being a solution of water and about 5% to about 10% ethanol). The solvent, in some embodiments, can also include a pH buffer for optimal ion conductivity and micro-structure in anodes made from aqueous dispersions. More generally, the solvent can include any suitable fluid for dispersing a binder, CNT pulp, and active material therein.

The dispersion, in accordance with various embodiments, can include any fluid mixture of CNT pulp, binder material, and solvent. In some embodiments, the dispersion can include about 0.1% to about 2% CNT pulp and about 0.4% to about 15% binder material dispersed in the solvent. For example, in some embodiments, the dispersion can include about 0.8% CNT pulp and about 4.8% binder dispersed in NMP solvent. In some embodiments, the dispersion can include about 1.0% CNT Pulp and about 4.5% binder dispersed in a solvent solution of 5% ethanol and water.

The step of combining 203 can include, for example, combining an active material and additional solvent with the dispersion to form another dispersion. The active material, in accordance with various embodiments, can include using the high-shear mixer (or an additional high-shear mixer) to combine the additional solvent and the active material with the dispersion. In accordance with various embodiments, the step of combining can be performed by operating the high-shear mixer at any appropriate speed for a period of time required to achieve a substantially uniform combination of the active material with the dispersion in the solvent. In some embodiments, the CNT pulp particles can thereby bind and intertwine with the active material (e.g., as shown in FIG. 3 and described with greater detail below), thereby partially forming the three-dimensional CNT pulp network.

In some embodiments, the active material can include, for example, one or more of Lithium iron phosphate (LFP), Nickel Manganese Cobalt oxides (NMC), Lithium Cobalt Oxide (LCO), Lithium Manganese Oxide (LMO), nanoscale silicon, graphite, or combinations thereof. More generally, the active material can be any material suitable for maintaining a positive or negative charge for storing electrical energy.

In some embodiments, the dispersion can include about 0.1% to about 2% CNT pulp, about 1% to about 5% binder material, and about 10% to about 50% active material dispersed in the solvent. For example, in some embodiments, the dispersion can include about 0.25% CNT pulp, about 1.0% binder, and about 50% active material dispersed in NMP solvent. In another embodiment, the dispersion can include about 0.5% CNT pulp, about 2.2% binder, about 50% active material, about 5% ethanol in water that is buffered to about pH=3.

The step of applying 203 the dispersion to a substrate can be performed, for example, using one or more of a doctor blade, knife, trowel, dispenser, or combinations thereof. More generally, the step of applying can be performed using any suitable devices or systems capable of distributing the dispersion over a substrate.

The substrate, in accordance with various embodiments, can include any material having a surface and chemically compatible with the dispersion. In some embodiments, for example, one or more of the substrate can include a current collector, a cathode collector, an anode collector, an aluminum foil or plate, a copper foil or plate, a stainless steel foil or plate, wire or foil of any other suitable metal, carbon material in the form of CNT sheet, tape, yarn, wire, graphene, graphite, or any combination thereof. In some embodiments, the substrate can instead include a Teflon or other sheet on which the dispersion can be cured and later removed. For example, in some embodiments, an anode or cathode collector can be integrated with the anode or cathode structure and, thus, the anode or cathode structure can be cured on the Teflon or other removable sheet and then removed for subsequent processing and use.

The step of curing 205 the dispersion to form a structure having a CNT pulp network formed therein can be performed, in accordance with various embodiments, by one or more of air drying or heating the dispersion. In some embodiments the dispersion is dried in air at 165C for two hours.

In accordance with various embodiments, once cured, the structure can include a body defined by the CNT pulp network, which can extend three-dimensionally throughout the active material, and the binder material binding the CNT pulp network with the active material. For example, referring now to FIG. 4, a scanning electron microscopy image is provided of a structure 300, in accordance with various embodiments, comprising a CNT pulp and binder network 301, binding the active material 303 to the CNT pulp and binder network 301.

The CNT pulp network 301 can be formed, for example, from CNT pulp produced as described in greater detail with reference to FIG. 3. Generally, the CNT pulp can be any CNT pulp capable of forming a three-dimensional CNT pulp network 301 for providing a conductive aid having long-range electrical connectivity throughout the structure (i.e., exceeding a percolation threshold of the structure) while enhancing mechanical properties and stability of the structure.

Figure 4:
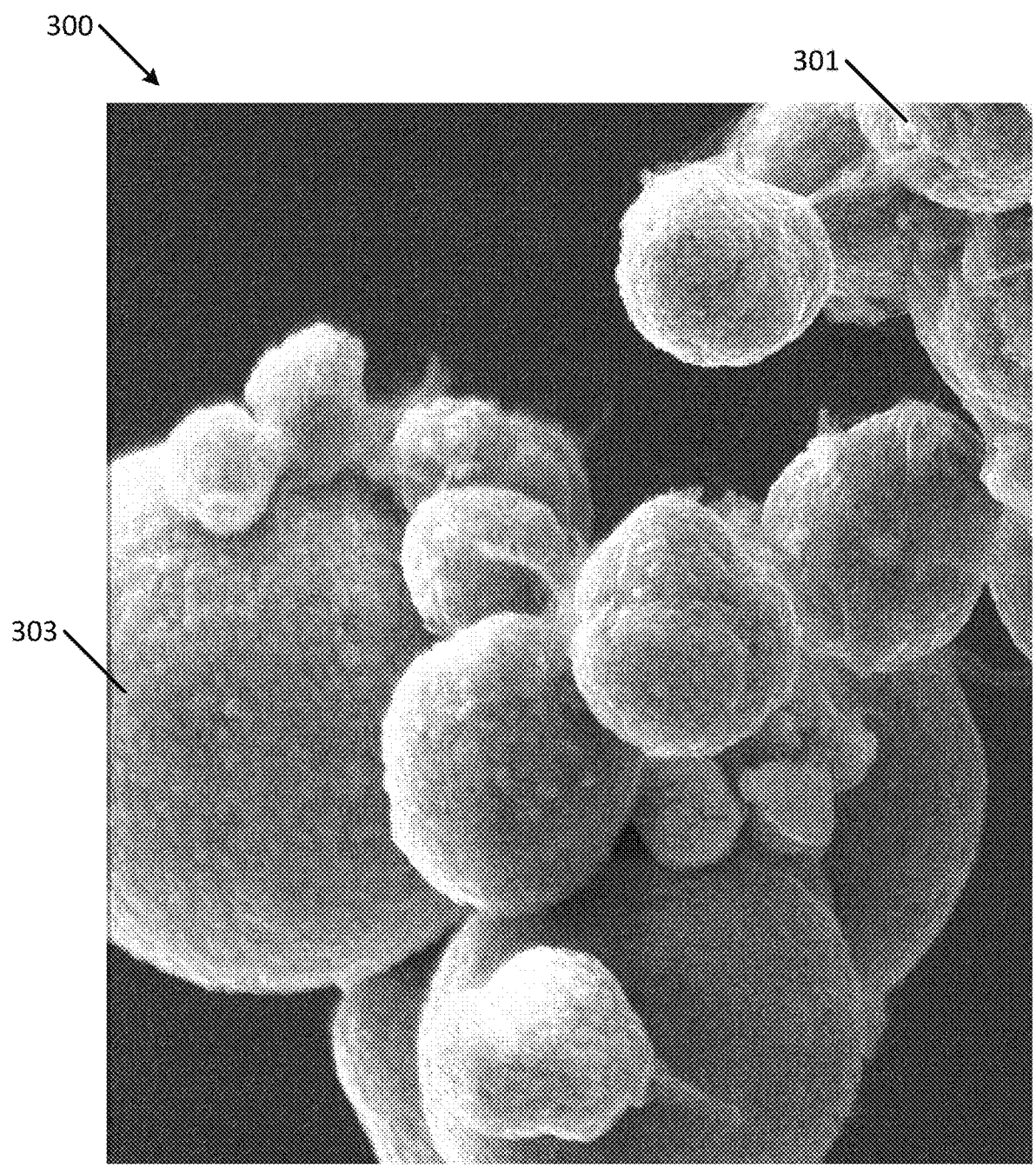
FIG. 4 is a microscopic image of a portion of a structure defined by a CNT pulp network in accordance with various embodiments.

The structure 300 depicted in the image of FIG. 4 includes a particular composition, by weight, of about 0.5% CNT pulp and about 3% PVDF binder in NMC active material, but structures in accordance with various embodiments are not limited to this composition. For example, any of the structures described herein can be used in accordance with various embodiments. Furthermore, it will be apparent in view of this disclosure that any composition having any combination of materials, any ratio of materials, and/or any width, height, thickness, or shape can be used in accordance with various embodiments provided that the CNT pulp network 301 is present in an amount sufficient for exceeding a percolation threshold (e.g., at about 0.5% CNT pulp) of the structure 300 and providing enhanced material properties to the structure 300.

Figure 5:
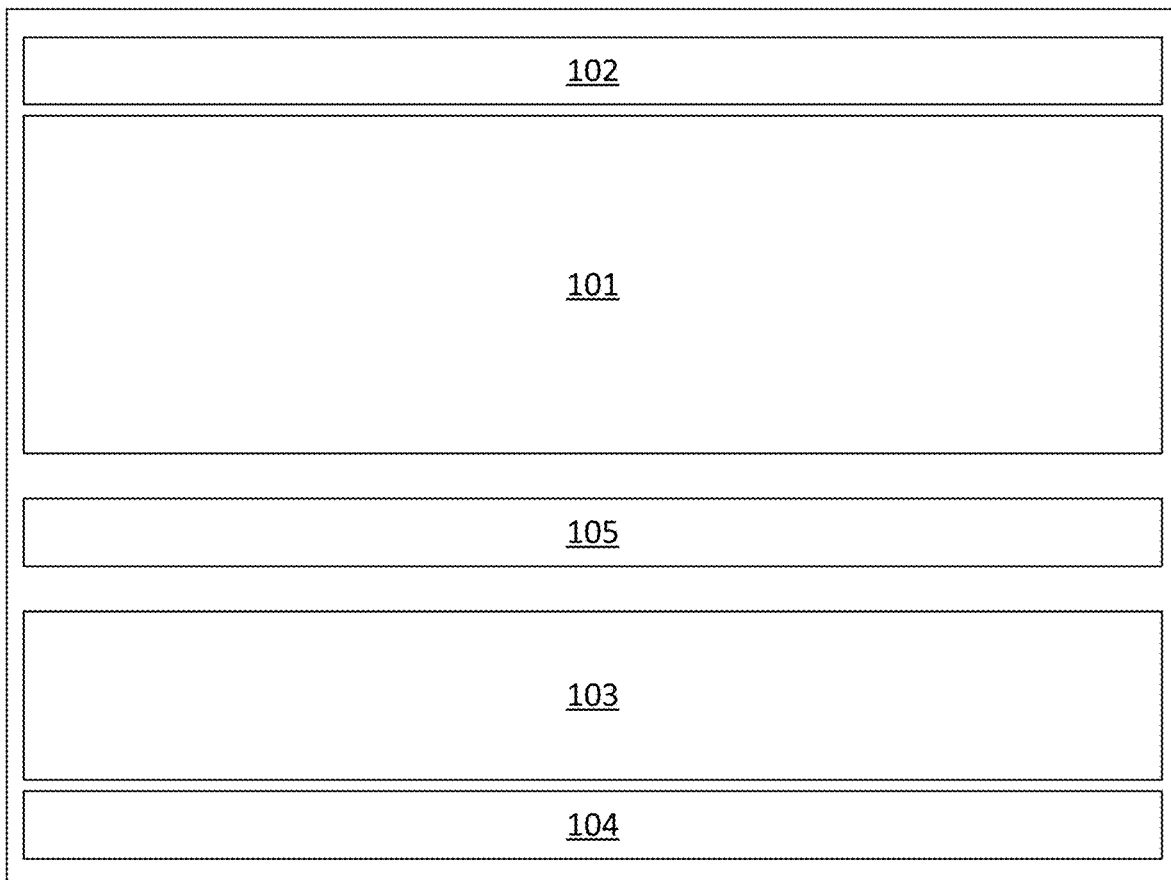
FIG. 5 is a block diagram illustrating an energy storage device including structures defined by CNT pulp networks in accordance with various embodiments.

Referring now to FIG. 5, an energy storage device (ESD) 100, in accordance with various embodiments, includes a first current collector 102 associated with a first active layer 101 and a second current collector 104 associated with a second active layer 103, and a separator 105 interposed therebetween.

The first and second current collectors 102, 104, in accordance with various embodiments can include aluminum foil, copper foil, stainless steel foil, wire or foil of any other suitable metal, carbon material in the form of CNT sheet, tape, yarn, wire, graphene, graphite, or any combination thereof. In some embodiments a distinctly separate current collector may not be required and one or both of the first and second current collectors 102, 104 can instead be integrated into the first or second active layer 101, 103.

In some embodiments, the first active layer 101 can be associated with current collector 102. The first active layer 101 can include, for example, an active material, binder, and a CNT network. In some embodiments, the first active layer can also include one or more performance enhancing materials. Performance enhancing materials, in some embodiments, may include, but are not limited to, carbon black, graphite, graphene, polymers, powder nanotubes, or any combination thereof. In some embodiments the first active layer 101 can be a battery cathode, and the active material can include, but is not limited to, lithium iron phosphate (LFP), Lithium Cobalt Oxide (LCO), Nickle Manganese Cobalt Oxides (NMC), Sulfur, Encapsulated Sulfur, polymers, any other materials that can store charge transport ions, or combinations thereof.

In some embodiments the first active layer 101 can be an electrode in a super-capacitor or pseudo-capacitor, and the active material can include of electrically conductive porous material, for example graphite, graphene, carbon fibers, carbon nanotubes, or any combination thereof, as well as materials exhibiting redox behavior, such as transition-metal oxides that may include but are not limited to Ruthenium Oxide, Iridium Oxide, or Manganese Oxide, or combinations thereof.

In some embodiments, the binder can include, but is not limited to, Polyvinylidene Fluoride (PVDF), Styrene Butadiene Rubber (SBR), Carboxymethyl Cellulose (CMC), or other suitable soluble or dispersible polymers, or combinations thereof.

In some embodiments, the separator 105 can prevent or inhibit direct electrical contact between the two current collectors 102, 104, but can permit passage of appropriate ions. The separator, in some embodiments, can include, but is not limited to, porous polyethylene (PE), and porous polypropylene (PP), nylon, fiberglass, boron nitride nanotubes, or combinations thereof.

In some embodiments, the second active layer 103 can be associated with the second current collector 104. The second active layer 103 can include an active material, binder, and dispersed CNT network. In some embodiments, the second active layer 103 can also include performance enhancing materials. In some embodiments the second active layer 103 can include a battery anode and the active material can include, but is not limited to, graphite, silicon, gallium, Tin Oxide, Iron Oxide, Titanium oxide, or any combination thereof. The binder could be, for example, Polyvinylidene Fluoride (PVDF), Styrene Butadiene Rubber (SBR), Carboxymethyl Cellulose (CMC), or other suitable dispersible polymers, or combinations thereof. In some embodiments the second active layer 103 can include an electrode in a super-capacitor or pseudo-capacitor, and the active material can include an electrically conductive porous material such as, for example, graphite, graphene, carbon fibers, carbon nanotubes, or any combination thereof.

In some embodiments, the first active layer 101 can include a structure constructed according to the methods described above with reference to FIG. 1, the first active layer 101 having a composition by weight of about 0.5% to about 20% CNT pulp, for example, about 1.0% to about 2.0% CNT pulp, about 2% to about 50% binder, for example, about 2% to about 5% binder, and about 30% to about 97.5% active material. For example, in some embodiments, the first active layer 101 can have a composition by weight of about 0.5% CNT pulp, 3% PVDF (binder), and about 96.5% active material.

In some embodiments, the second active layer 103 can include a structure constructed according to the methods described above with reference to FIG. 1, the second active layer 103 having a composition by weight of about 0.5% to about 2% CNT pulp, about 2% to about 5% binder, and about 10% to about 95% nanoscale silicon. In some embodiments, the second active layer 103 can further include graphite, wherein the second active layer 103 includes about 7.5% to about 87.5% graphite. For example, in some embodiments, the second active layer 103 can have a composition by weight of about 1% CNT pulp, about 4.5% CMC (binder), about 10% nanoscale silicon, and about 84.5% graphite.

Figure 6:
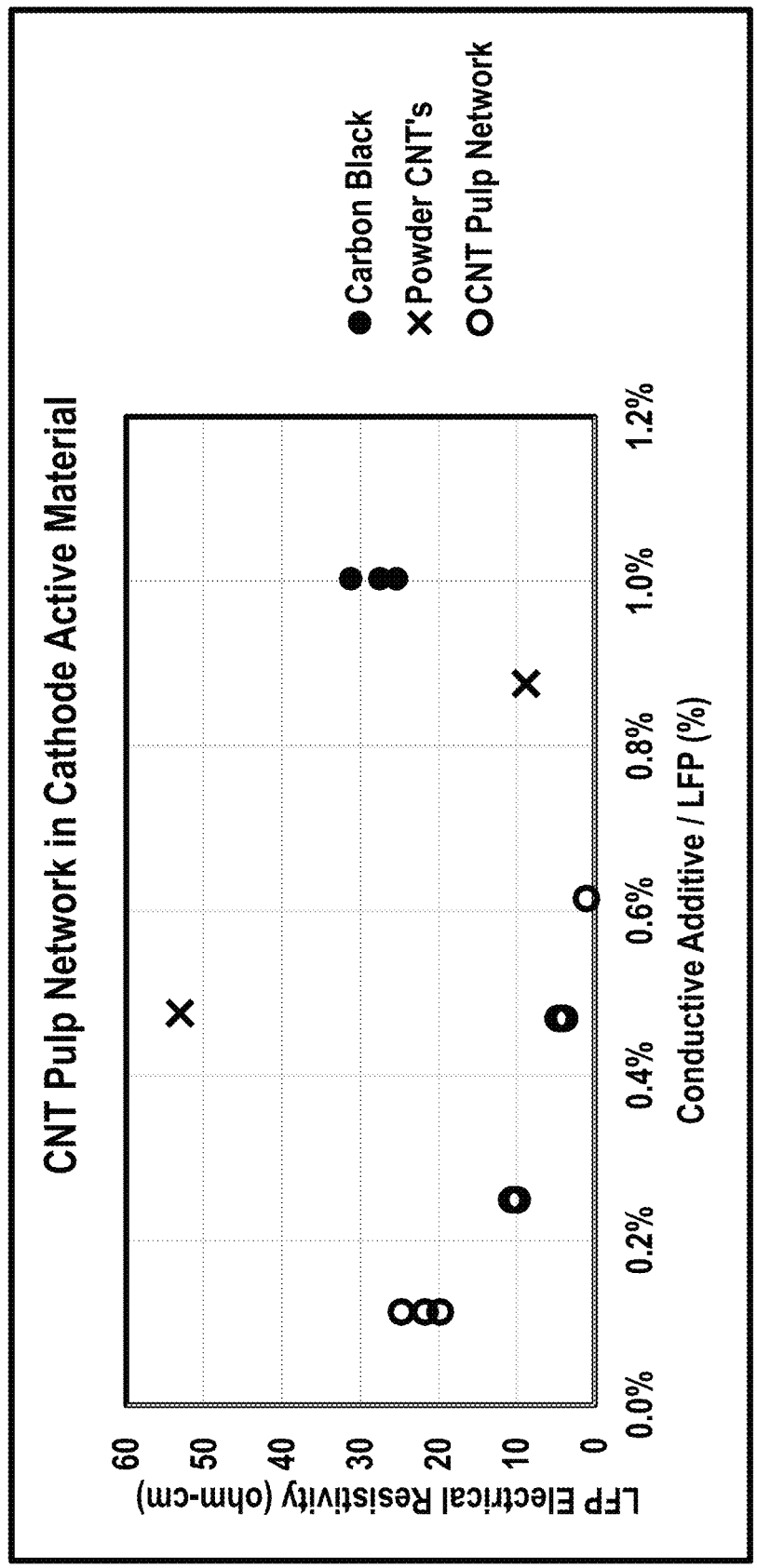
FIG. 6 is a plot illustrating resistivity of various lithium iron phosphate cathode composites in accordance with various embodiments.

FIG. 6 is a plot illustrating resistivity in ohm-centimeters of various lithium iron phosphate cathode composites in accordance with various embodiments. In particular, FIG. 6 compares a resistivity of a conventional cathode composite having about 1% carbon black by weight dispersed in lithium iron phosphate (LFP) active material, conventional cathode composites having about 0.5% and about 0.9% CNT powder dispersed in LFP, and a cathode composite having about 0.1% to about 0.6% CNT pulp dispersed in LFP in accordance with the present disclosure. As shown in FIG. 6, the about 0.6% CNT pulp cathode composite exhibits substantially reduced resistivity (e.g., about 1 ohm-cm as compared to about 10 ohm-cm for CNT powder and about 30 ohm-cm for carbon black) at lower concentrations (about 0.6% by weight as compared to about 0.9% for CNT powder and 1% for carbon black) than the conventional carbon black and powder CNT composites. Advantageously, reduced resistivity permits faster charging and discharging of the cathode and the lower concentration of conductive aid permits additional active material to be included in the cathode, thereby increasing cathode capacity.

Figure 7:
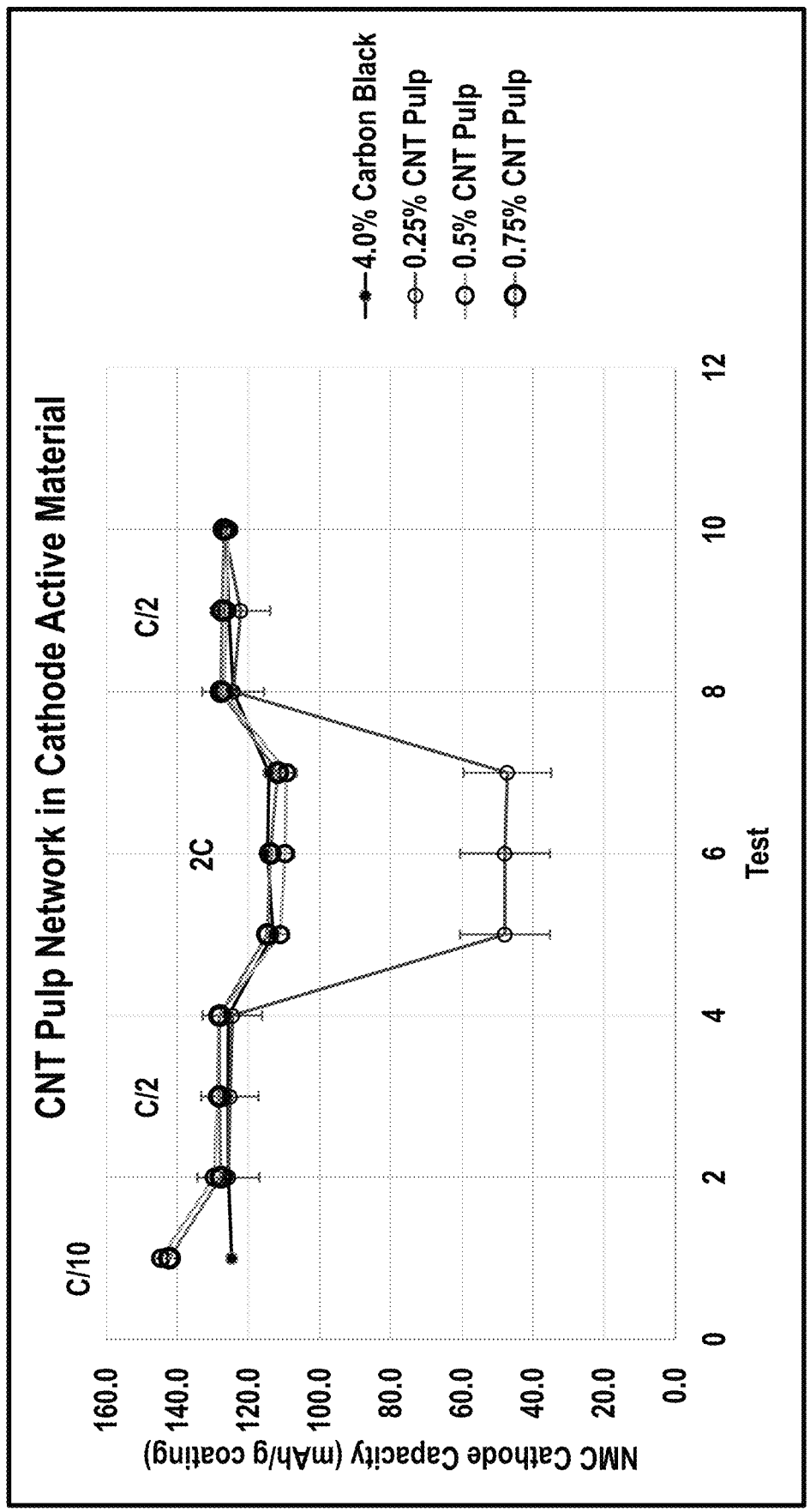
FIG. 7 is a plot illustrating cathode discharge capacity of various cathode compositions in accordance with various embodiments.

In some embodiments, the CNT pulp forming the CNT pulp network can advantageously exceed a percolation threshold of the structure. FIG. 7 is a plot illustrating cathode capacity in mAh/g of various Nickel-Manganese-Cobalt (NMC) cathode compositions in accordance with various embodiments. In particular, FIG. 7 illustrates the cathode capacity at various cathode discharge rates for a conventional composite of 4% carbon black dispersed in NMC, a composite of about 0.25% CNT pulp in NMC, a composite of about 0.5% CNT pulp in NMC, and for a composite of about 0.75% CNT pulp in NMC. As shown in FIG. 7, the about 0.25% CNT pulp composite does not achieve a complete percolation threshold and thus exhibits a relatively low capacity of about 50 mAh/g at a discharge rate of 2 C. However, at lower discharge rates such as C/2 and C/10, the about 0.25% CNT pulp composite is able to match the performance of the incumbent 4% carbon black technology. As further shown in FIG. 7, each of the other composites exhibits a similar capacity of about 110 mAh/g at a discharge rate of 2 C but the about 0.5% CNT pulp composite and the about 0.75% CNT pulp composite exhibit a higher capacity (about 140 mAh as compared to about 120 mAh for the carbon black) at a lower discharge rates such as C/10. Thus, as shown in FIG. 7, structures formed with CNT pulp networks can achieve a percolation threshold at an 8× lower concentration (i.e., about 0.5% vs. about 4%) of conductive additive as compared to conventional carbon black compositions for a discharge rate of 2 C (high power applications) For lower power applications a 16× lower concentration is adequate.

Figure 8:
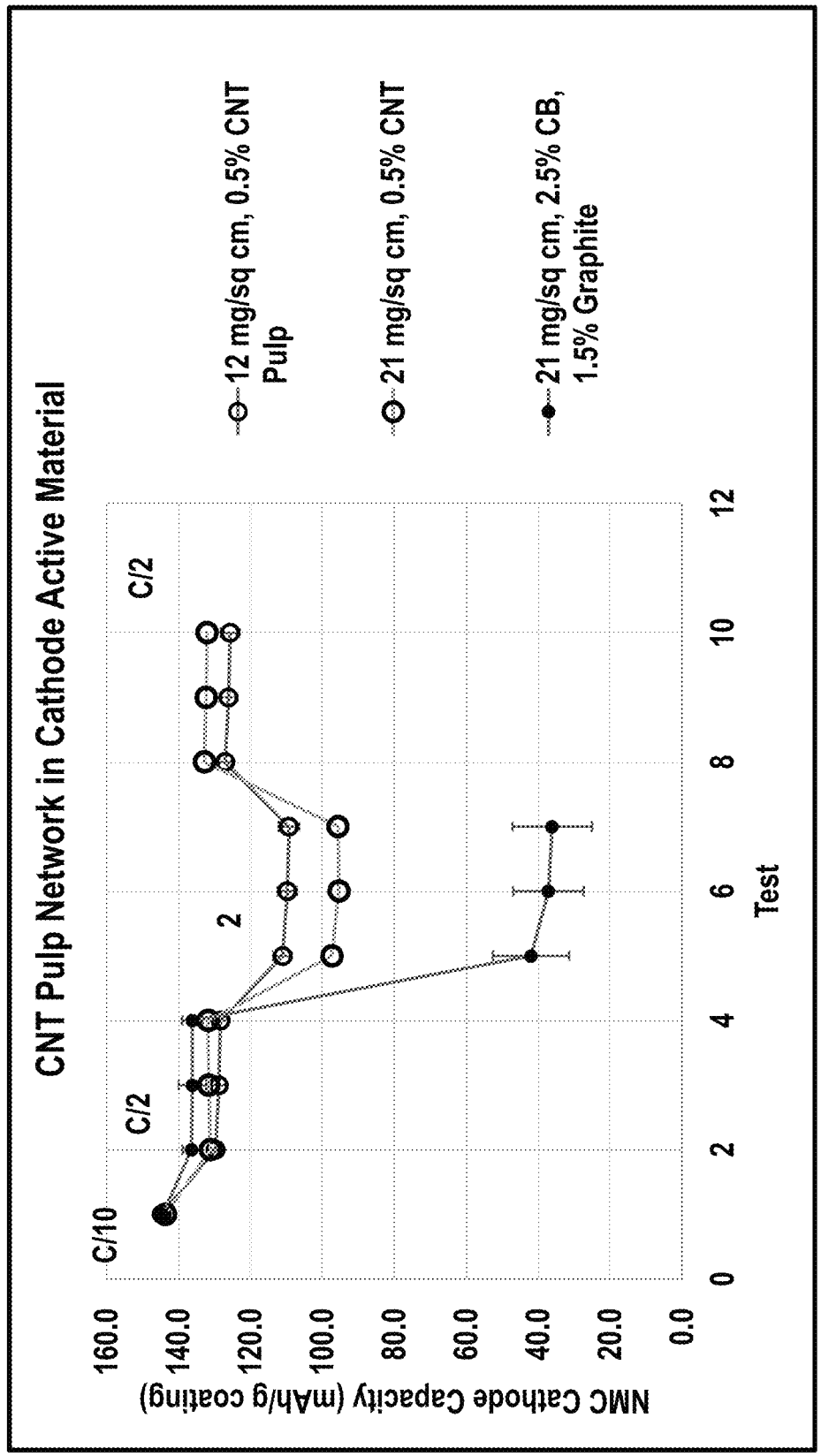
FIG. 8 is a plot illustrating cathode discharge capacity of various cathode loadings and compositions in accordance with various embodiments.

In some embodiments, because the CNT pulp network imparts improved mechanical properties and lower resistivity to the cathode, cathodes with higher loading of active material can be formed. FIG. 8 is a plot illustrating cathode capacity in mAh/g of various cathode loadings as indicated by cathode material density in milligrams per square centimeter (mg/sq cm) in accordance with various embodiments. In particular, FIG. 8 illustrates the cathode capacity at various cathode discharge rates for a conventional composite of about 2.5% carbon black and about 1.5% graphite dispersed in NMC having an active material loading of about 21 mg/sq cm, a composite of about 0.5% CNT pulp in NMC having an active material loading of about 12 mg/sq, and a composite of about 0.5% CNT pulp in NMC having an active material loading of about 21 mg/sq. As shown in FIG. 8, due to the greater thickness of the conventional composite of about 2.5% carbon black and about 1.5% graphite, the conventional composite breaks down at the higher discharge rate of 2 C to a cathode capacity of about 40 mAh/g. By contrast, the thicker about 0.5% CNT pulp composite exhibits cathode capacity largely consistent with the thinner about 0.5% CNT pulp composite (about 110 mAh/g at discharge rate 2 C as compared to about 120 mAh/g for the about 12 mg/sq cm composite).

The improvement in performance of the cathode occurs because the CNT pulp network enhances the electrical conductivity as well as the mechanical stability of the active material layer. Cathode active materials (AM) are inherently non-conductive, and need a conductive additive (CA) to transport charge into and out of the AM. Conventional CA technology is carbon black (CB). However, CB does not impart any mechanical strength to the material, therefore, as the AM gets thicker, the cathode becomes less mechanically stable, because more CB is needed to reach percolation threshold, and at some point the cathode active layer falls apart. In tension with this concern, it is desirable in battery functionality to make the active layer as thick as possible to reduce the volume in the cell taken up by non-active material, such as separators and current collectors. However, increasing the quantity of CB (e.g., from about 4% to about 5% CB or due to increased thickness) dramatically degrades the tensile strength of the electrode to nearly zero. At higher than about 5% CB concentration, the cathode material mud-cracks upon drying. Advantageously, the CNT pulp network disclosed herein not only imparts better electrical conductivity and thus requires less conductive additive, but also enhances mechanical stability. Therefore, the CNT pulp network of the present disclosure permits thicker cathodes without mechanical and electrical breakdown of the cathode.

Figures 9A, 9B:
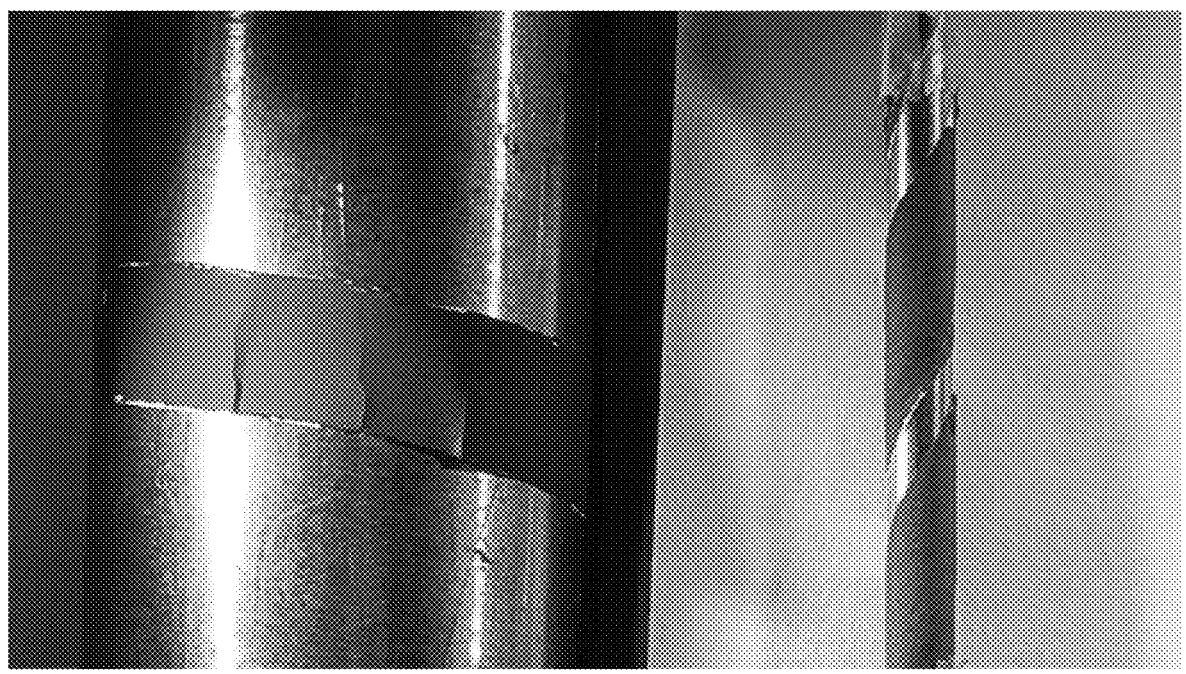
FIG. 9A is an image of a conventional cathode undergoing flexure.
FIG. 9B is an image of a structure defined by a CNT pulp network undergoing flexure in accordance with various embodiments.

Referring now to FIGS. 9A-9B, the enhanced mechanical stability imparted by the CNT pulp network further permits greater flexibility of the cathode and anode and, thus, any overall battery using such anodes and cathodes. Battery flexibility can be helpful for a wide range of applications, including wearable electronics, and personal computers. However, to obtain true flexibility in a battery the anode and the cathode must be mechanically robust and flexible. FIG. 9A is an image of a conventional cathode having about 5% carbon black additive in LFP and FIG. 9B is an image of a cathode structure of the present disclosure having about 1% CNT pulp in LFP. As shown in FIG. 9A, the conventional cathode cracks when wrapped around a 2.5 cm diameter dowel. By contrast, as shown in FIG. 9B, the about 1% CNT pulp cathode does not crack, even when wrapped around a 0.32 cm dowel. It will be apparent in view of this disclosure that any other composition including CNT pulp can be used in accordance with various embodiments. Generally, an increased percentage of CNT and binder can provide additional flexibility, although there will likely be a trade-off between flexibility and capacity. However, in all compositions, the inclusion of CNT pulp material can impart flexibility and strength to battery active material that cannot be obtained by conventional carbon black or CNT powder additives.

Figure 10:
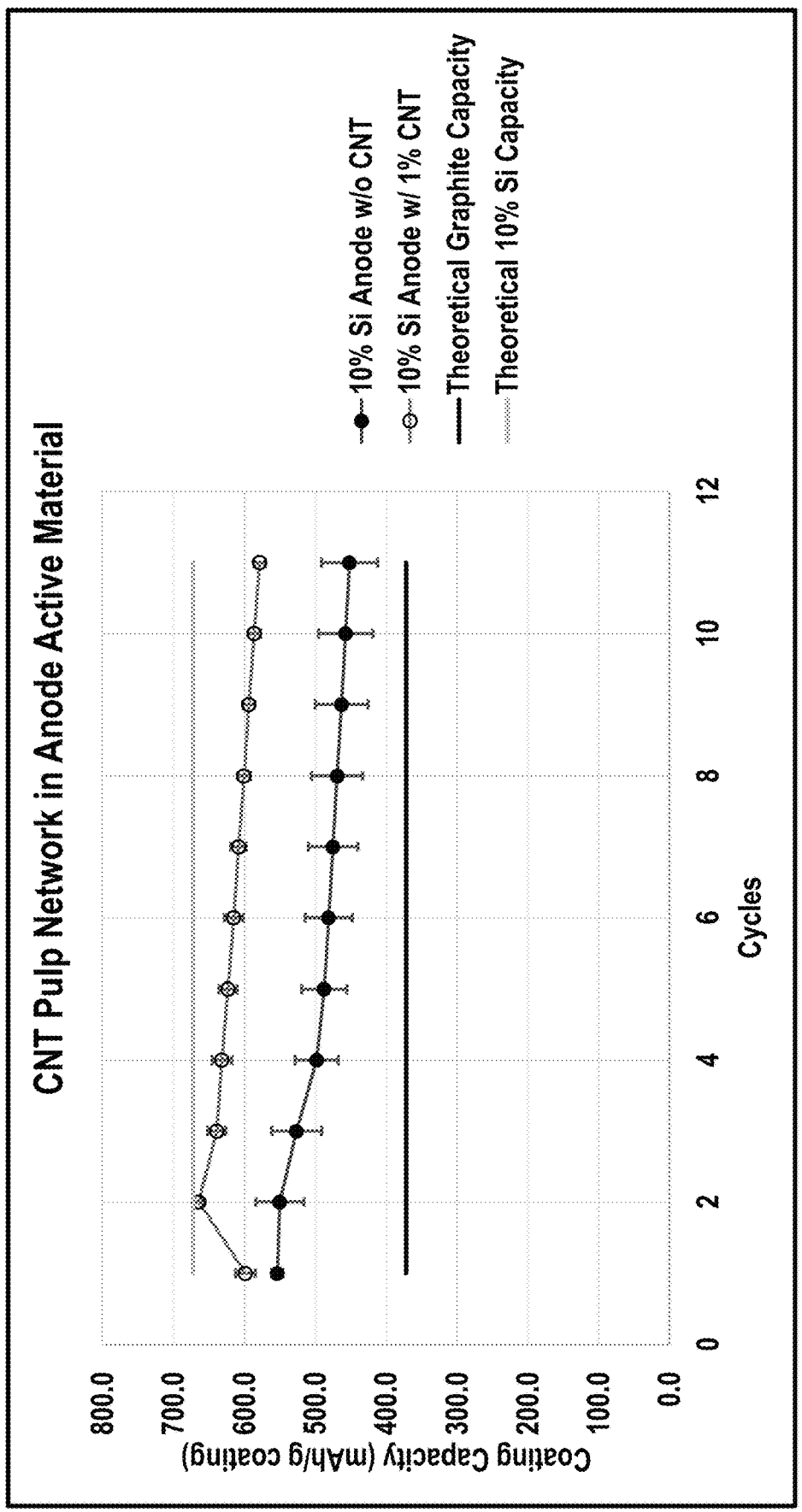
FIG. 10 is a plot illustrating anode capacity of various anode compositions in accordance with various embodiments.

In some embodiments, anodes can be provided having a CNT pulp network extending therethrough. FIG. 10 is a plot illustrating anode capacity in mAh/g of various anode compositions over time in accordance with various embodiments. In particular, FIG. 10 illustrates anode capacity as a function of charge/discharge cycles for a conventional composite of about 10% nanoscale silicon (Si) in graphite and a composite of about 10% nanoscale silicon and about 1% CNT pulp in graphite in accordance with various embodiments as juxtaposed with the maximum theoretical capacities of an all-graphite anode and a about 10% silicon nanomaterial anode. The theoretical capacity of the about 10% Si anode is calculated based on an assumed maximum Li—Si stoichiometry of $Li_{15}Si_4$. As shown in FIG. 10, the anode including the about 1% CNT pulp outperforms the composite without CNT pulp by maintaining a higher anode capacity over all 11 test cycles and even approaches the theoretical maximum anode capacity for an about 10% silicon anode at the second cycle. This further illustrates that additions of CNT pulp can be used to enhance both the electrical and mechanical properties of a coating even when including large surface area nanoparticles such as Silicon.

By way of background, silicon is an attractive material for storing lithium metal in the anode of an LiB due to its high theoretical capacity: 4200 mAh/g for $Li_{22}Si_5$, or 3572 mAh/g for $Li_{15}Si_4$, compared to conventional anode technology (i.e., Graphite) with a theoretical capacity of only 372 mAh/g. However, one persistent issue with the silicon addition to LiB anodes is that the capacity fades with charge/discharge cycles. The fading is due to cracking/pulverization of the Si due to the 3× to 4× expansion/contraction during lithiation/delithiation. This cracking does not occur with nanoscale Si, defined as silicon that is less than about 50 nanometers in diameter or thickness. However, production of nanoscale Si is typically very expensive, very difficult, or both, and creates challenges due to its high surface area in incorporating them into a coating that is both coat-able and subsequently mechanically robust. The fading seen in capacity with cycling seen in FIG. 10 is believed to be due to the presence of a significant fraction of Si particles greater than about 50 nm.

Figure 11:
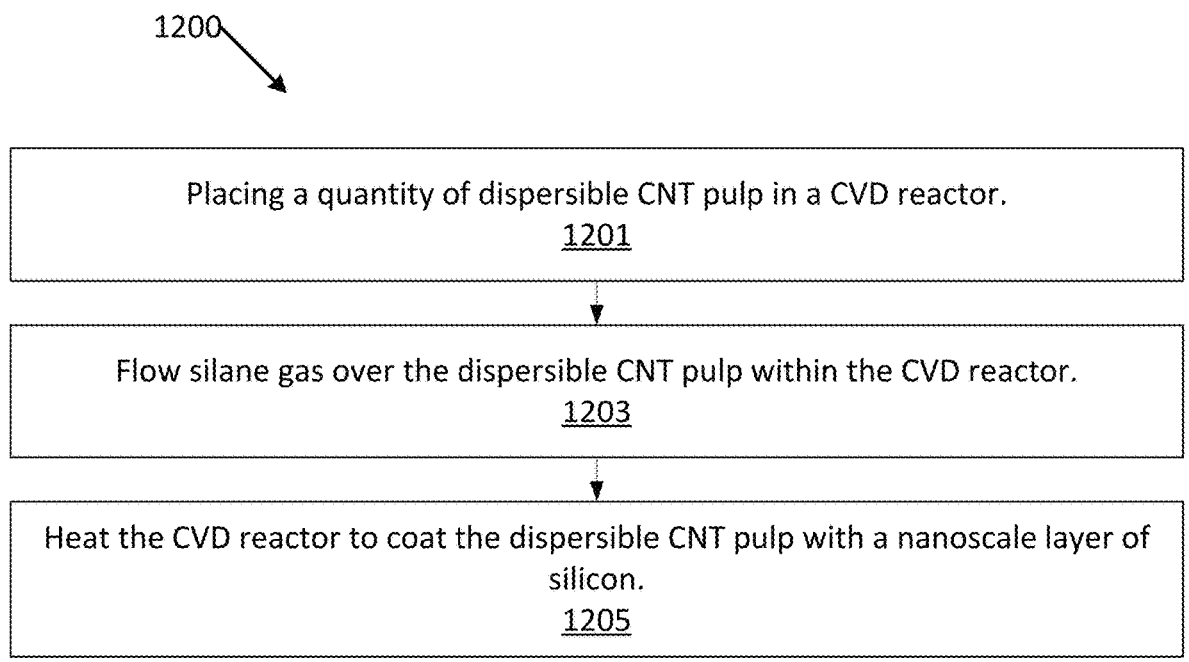
FIG. 11 is a flowchart illustrating a method for forming nanoscale silicon in accordance with various embodiments.

Referring now to FIG. 11, a chemical vapor deposition (CVD) method 1200 is provided for forming a nanoscale silicon material. The method includes a step of placing 1201 a quantity of CNT pulp in a CVD reactor. The method also includes a step 1203 of flowing silane gas over the CNT pulp within the CVD reactor. The method also includes a step 1205 of heating the CVD reactor to coat the CNT pulp with a nanoscale layer of silicon.

The step of placing 1201 the quantity of CNT pulp in the CVD reactor can be performed, for example, by placing a quantity of a CNT pulp produced as described hereinabove or a quantity of another CNT nanoparticle into a CVD reactor. The CVD reactor, in accordance with various embodiments, can include one or more of a cold-wall fluidized bed reactor, a hot-wall resistively heated furnace, or combinations thereof.

The step of flowing 1203 silane gas over the CNT pulp within the CVD reactor can be performed, for example, by providing a flow (e.g., via a compressed gas line, a gas bottle, or any other suitable gas flowing mechanism) of silane gas to the CVD reactor. In some embodiments, the step of flowing 1203 can also include flowing the silane gas along with one or more additional gases in a mixture. For example, in some embodiments, a mixture of hydrogen, silane, and argon can be flowed over the CNT pulp within the CVD reactor.

The step of heating 1205 heating the CVD reactor to coat the CNT pulp with a nanoscale layer of silicon can be performed, for example, by heating a cold-wall quartz furnace by inductive heating or microwave heating or by heating a hot-wall resistively heated furnace by resistively heating the reactor. It will be appreciated in view of this disclosure that, in accordance with various embodiments, the desired coating thickness and uniformity can be controlled by varying the pulp temperature, furnace pressure, and input gas composition and flow rate.

Various aspects of the present disclosure may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments. Also, the phraseology and terminology used herein is for the purpose of description and should not be regarded as limiting.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for the use of the ordinal term) to distinguish the claim elements.

What is claimed is:

1. A method for forming a nanoscale silicon layer on CNT pulp comprising:
   placing a quantity of the CNT pulp in a Chemical Vapor Deposition (CVD) reactor;
   flowing silane gas over the CNT pulp within the CVD reactor; and
   heating the CNT pulp in order to coat the CNT pulp with a nanoscale layer of silicon
   wherein the CNT pulp comprises a 3-dimensional extended network of interconnected carbon nanotubes each having a length of more than 1 mm.

2. The method of claim 1, further comprising flowing at least one of argon gas or hydrogen gas with the silane gas over the CNT pulp within the CVD reactor.

3. The method of claim 1, wherein the nanoscale layer of silicon coated on the CNT pulp is less than 50 nanometers thick.

4. The method of claim 1, wherein the CVD reactor is a hot-wall resistively heated furnace and the step of heating further comprises resistively heating the CVD reactor.

5. The method of claim 1, wherein the CVD reactor is a cold-wall fluidized bed reactor and the step of heating the CNT pulp further comprises at least one of inductive heating or microwave heating.

* * * * *